Patented Jan. 28, 1941

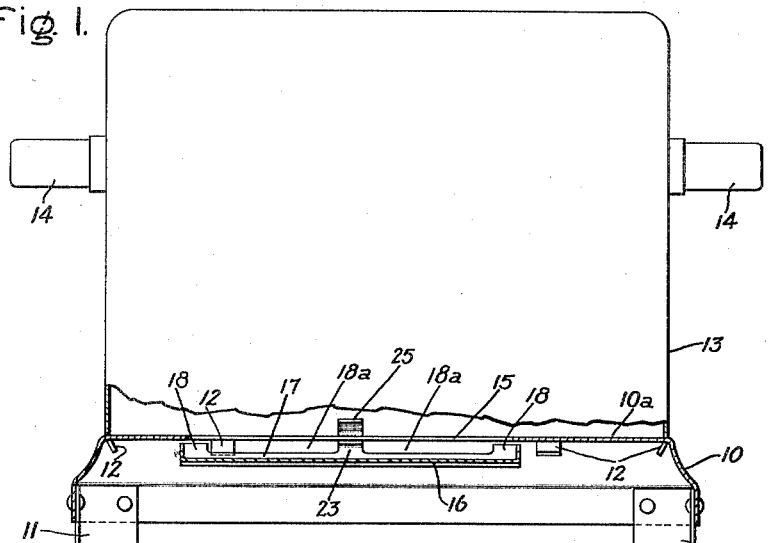
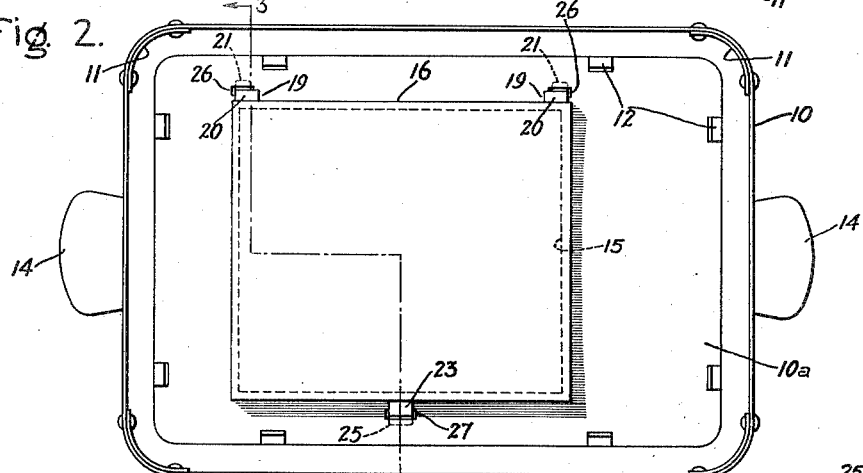
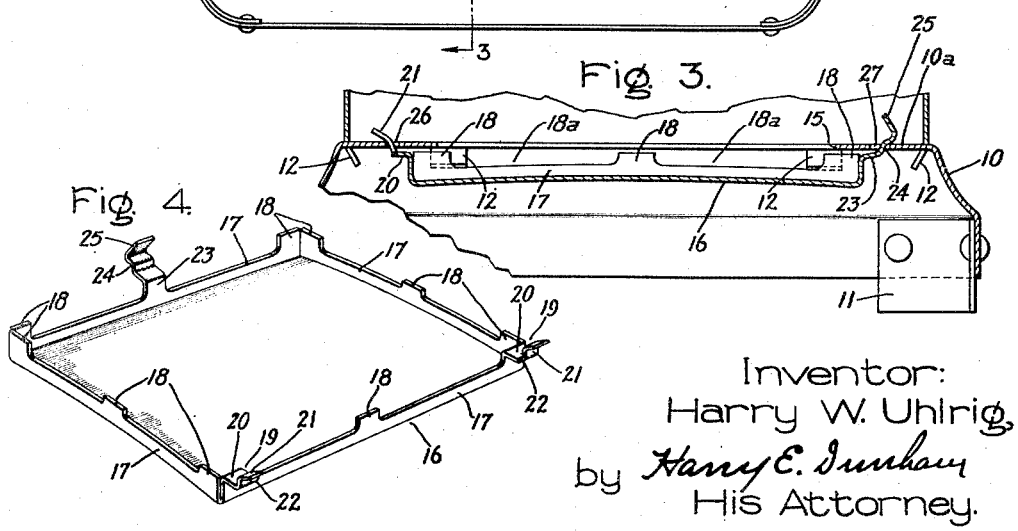
Inventor:
Harry W. Uhlrig,
by Harry E. Dunham
His Attorney.

2,229,945

UNITED STATES PATENT OFFICE 2,229,945

CRUMB TRAY FOR ELECTRIC TOASTERS

Harry W. Uhlrig, Stratford, Conn., assignor to General Electric Company, a corporation of New York Application September 21, 1939, Serial No. 295,930

10 Claims. (Cl. 53—5)

My invention relates to electric toasters and more particularly to a new and improved crumb tray construction to be used with an electric toaster and has for one of its objects the provision of a simple and rugged removable crumb tray construction which may be manufactured at low cost.

It is another object of my invention to provide an electric toaster with a new and improved crumb tray construction which can be readily detached without the use of any special tools.

It is a further object of my invention to provide an improved crumb tray construction which may be readily detached from the electric toaster without inverting the toaster or causing the crumbs collected in the tray to be spilled into the inner portions of the toaster.

It is a further object of my invention to provide a crumb tray for an electric toaster which is detachably mounted on the base of the toaster and is held in position by a latch concealed from view but readily operated without inverting the toaster.

It is a further object of my invention to provide a crumb tray construction having a simple yet rugged hinge arrangement and an improved snap catch for detachably mounting the crumb tray on the base of the toaster.

Further objects and advantages of my invention will appear as the following description proceeds and the features of novelty which characterize my invention will be pointed out with particularity in the claims appended to and forming a part of this specification.

For a fuller understanding of my invention reference should be had to the accompanying drawing in which Fig. 1 is a side elevation partly in section of an electric toaster showing my improved crumb tray construction attached to the base thereof; Fig. 2 is a bottom view of the toaster shown in Fig. 1 showing my improved crumb tray in its attached position; Fig. 3 is an enlarged fragmentary sectional view taken on the line 3—3 of Fig. 2 and illustrating details of construction of my improved crumb tray; and Fig. 4 is a perspective view of my improved crumb tray.

Referring more specifically to the drawing and particularly to Fig. 1, it will be observed that I have shown my improved crumb tray construction attached to an electric toaster having a base portion 10 to which is attached a plurality of leg members 11. Fastened to the base portion by means of a plurality of lugs 12, which are adapted to extend through suitable spaced openings provided in the base portion and to be bent inwardly as shown in Fig. 1, is a casing 13 enclosing the toasting compartment of the toaster. Attached to the casing are suitable handles 14, one of which is movable for operating the toaster timing mechanism as is well understood in the art. Since this invention relates to the crumb tray construction to be used with an electric toaster, it has been deemed unnecessary to describe further details of the toaster. It will be understood, however, that details such as the heating elements and operating mechanism for a bread carrying rack are mounted on the base portion 10 and are contained in compartments defined by the casing 13.

The base 10 is provided with a substantially rectangular shaped supporting surface 10a. Provided in the surface 10a is a substantially rectangular shaped opening 15 which is located so that any crumbs falling from the bread being toasted will fall therethrough. In addition to serving as an opening through which crumbs may fall, the opening 15 serves as an inlet through which cold air will be drawn into the casing 13 due to the chimney effect obtained by means of the heating elements located in this casing, the draft of air serving to facilitate and complete the toasting operation as is well understood in the art.

Arranged directly below the opening 15 so as to receive the crumbs which fall therethrough is the crumb tray 16. In previous arrangements, the crumb tray has been fastened to the toaster by means of thumb screws or other similar fastening means and it has been necessary to turn the toaster up side down in order to remove the tray. Such an arrangement, of course, defeats the purpose of the crumb tray since the crumbs will be spilled into the toaster mechanism and also on to the table surface. To obviate this difficulty, I have constructed and arranged my improved crumb tray so that it is readily detached from the toaster without inverting the toaster and without using any special tools.

Referring to Figs. 3 and 4, it will be observed that my improved crumb tray construction comprises the substantially rectangular shaped tray 16 having wall portions 17 which are provided at spaced intervals with projections 18 which are adapted to engage the under side of the surface 10a so as to define a plurality of openings 18a which communicate with the opening 15 and permit air to be drawn into the upper casing 13 for the purpose described above. The tray 16 is arranged to be removably hinged on the surface 10a. In order to effect this hinging relation, a pair of hinge lugs 19 is integrally formed on one of the walls 17 adjacent two corners of the tray. Each of the hinge lugs 19 comprises a substantially horizontally extending portion 20, which lies substantially perpendicular to the side walls 17, and a curved upwardly extending portion 21. As shown in Figs. 2 and 4, the upwardly extending portion 21 is narrower than the horizontal portion 20 so that an abutment 22 is formed on each of the hinge lugs for a purpose which will be more fully described hereinafter.

Provided on the wall opposite that on which the hinge portions 19 are formed is an integrally formed clip 23 which is provided with a detent portion 24 and an upwardly extending guiding portion 25. The spring clip 23 is constructed and arranged so that it receives its spring action not only from its own flexibility but also from a flexing of the entire base of the tray. This prevents overstressing of the metal in the clip and produces the necessary flexibility in the clip for proper engagement with the base. It has been found that a slight curvature of the base of the crumb tray improves the clip action and in the preferred form of my invention the tray base is curved as shown in Fig. 3.

Provided in the surface 10a of the base portion is a pair of spaced slots 26 which are constructed and arranged to receive the hinge lugs 19, as shown in Figs. 2 and 3. As previously described, the portion 21 of the hinge lug is narrower than the portion 20. The width of the slots 26 is sufficient to permit the portion 21 to be inserted thereinto and the abutment 22 formed at the reduction in width of the two portions of the hinge lug serves to limit the movement of the lug into the opening. This prevents insertion of the lug to a depth that would cause it to bind in the slot 26 and thus impede the hinging action or, in an extreme case, bend or break the hinge lugs so that the tray would have to be repaired or replaced.

Also provided in the surface 10a of the base 10 is an additional slot 27 which lies opposite the pair of slots 26 and is constructed and arranged to receive the clip 23. When the crumb tray is in its attached position, the detent portion 24 of the clip engages one edge of the surface 10a adjacent the slot 27 and latches the tray in its attached position.

As previously pointed out, any crumbs which fall from the material being toasted will drop through the opening 15 into the tray 16. When it is desired to remove the tray for cleaning, it is only necessary to press downwardly on the side of the tray on which the spring clip is formed. This causes the tray to hinge about the hinge lugs 19 until the edge of the surface 10a is moved out of the detent 24 and the guide portion 25 of the clip is moved out of the slot 27. When this occurs, the upwardly extending portion 21 of the hinge lugs 19 will drop out of the slots 26 and the tray will be completely detached from the toaster so that it may be separately cleaned. It will thus be observed that by my improved construction and arrangement the crumb tray is simply and easily detached from the toaster without causing any of the crumbs to be spilled into the operating mechanism of the toaster.

The tension of the spring clip is such that the tray will be firmly held in its supported position but at the same time may be readily released by pressing downwardly on the tray adjacent the spring clip. In its preferred form, the spring clip is arranged so as to be concealed from view as shown in Fig. 3. When such an arrangement is used, the tray may be released by inserting the fingers or some suitable kitchen utensil, such as a knife, under the toaster and into one of the spaces 18a provided between the surface 10a of the base portion and the top edge of one of the walls 17 of the tray and pressing downwardly on the tray with the utensil used. In this manner, the tray is caused to drop downwardly on to the supporting table as previously described.

In attaching the tray to the base, the upwardly projecting portions 21 of the hinge lugs are inserted in the slots 26 until the abutment 22 engages the surface 10a. The tray is then pivoted about these lugs as hinge points until the guide portion 25 of the spring clip is inserted in the slot 27. The tray is then moved upwardly an additional amount until the detent 24 snaps over the edge of the surface 10a adjacent the opening 27 to hold the tray in position.

From the foregoing description, it will be observed that I have provided an improved crumb tray construction which is detachably mounted on the toaster by a simple yet effective hinge arrangement. It will also be observed that I have provided an improved crumb tray construction which is entirely concealed from view and in no way mars the outward appearance of the toaster construction.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. In an electric toaster having a toasting compartment, a base member, a supporting surface on said base member having an opening therein communicating with said toasting compartment so that crumbs from the material being toasted may be collected therethrough, a crumb tray constructed and arranged to cover said opening so as to receive said crumbs falling therethrough, and means for removably hinging said crumb tray to the under side of said supporting surface so that said tray may be removed therefrom without inverting said toaster and spilling the crumbs collected thereon.

2. In an electric toaster having a toasting compartment, a base member having an opening therein communicating with said toasting compartment, a tray constructed and arranged to cover said opening so as to collect crumbs which fall therethrough, means for removably hinging said tray on said base member, and means for latching said tray to the said base member.

3. In an electric toaster, a base member, a supporting surface on said base member having an opening therein through which crumbs are adapted to fall, a tray constructed and arranged to cover said opening, hinge lugs on said tray adapted to cooperate with slots in said surface for removably hinging said tray to said surface, means on said hinge lugs for limiting the movement thereof into said slots in said surface, and a resilient clip on said tray adapted to cooperate with said surface for latching said tray thereonto.

4. In an electric toaster, a toasting compartment, a base for supporting said toasting compartment and having an opening therein communicating with said compartment, a pair of slots on one side of said opening and a single slot on the opposite side of said opening, a tray constructed and arranged to cover said opening so as to collect crumbs falling from said toasting compartment, a pair of hinged lugs formed on one side of said tray and adapted to cooperate with said pair of slots to removably hinge said tray to said base, and a spring clip mounted on the opposite side of said tray and adapted to cooperate with said single slot to detachably latch said tray on said base.

5. In an electric toaster, a toasting compartment, a base for supporting said toasting compartment and having an opening therein communicating with said compartment, a pair of slots on one side of said opening and a single slot on the opposite side of said opening, a tray constructed and arranged to cover said opening so as to collect crumbs falling from said toasting compartment, a pair of hinged lugs formed on one side of said tray and adapted to cooperate with said pair of slots to removably hinge said tray to said base, means for limiting the movement of said hinge lugs into said slots so as to prevent binding or breaking of said hinge lugs, and means cooperating with said single slot for detachably latching said tray to said base.

6. In an electric toaster, a base member, a supporting surface on said base member having an opening therein communicating with the toasting compartment of said toaster, a crumb tray having a bottom wall and a plurality of side walls, means for removably hinging said crumb tray on said supporting surface so as to cover said opening, and means for latching said crumb tray to said surface, said last mentioned means including a clip mounted intermediate the ends of one of said side walls and constructed and arranged so that the resilience of said bottom wall of said tray is imparted to said clip to increase its flexibility and produce proper engagement with the base.

7. In an electric toaster, a base member having an opening therein through which crumbs are adapted to fall, a tray constructed and arranged to cover said opening, means for removably hinging said tray to said base portion, and means on the side walls of said tray cooperating with said base portion to define openings which communicate with said first mentioned opening to permit the passage of air into said toaster.

8. In an electric toaster having a toasting compartment, a supporting base having an opening therein communicating with said toasting compartment so that crumbs may be collected therethrough and a draft of cold air may be drawn into said compartment, a crumb tray removably hinged on said base member adjacent said opening so as to collect the crumbs which fall therethrough, means on said tray cooperating with said base member so as to latch said tray on said base member, and means including abutments provided on the side walls of said tray defining openings communicating with said opening in said base so that cold air may be drawn into said toasting compartment to aid the toasting operation.

9. In an electric toaster, a removable crumb tray comprising a substantially rectangular tray having side walls, a pair of hinged lugs integrally formed at the corners of one of said side walls, and a resilient spring clip formed intermediate the ends of the side wall disposed opposite said first mentioned side wall.

10. In an electric toaster, a removable crumb tray having a slightly curved bottom wall and a plurality of side walls, a pair of laterally spaced hinge lugs mounted on one of said side walls, an abutment formed on each of said hinge lugs, and a resilient clip mounted intermediate the ends of the side wall opposite said one of said side walls so that the resilience of said curved bottom wall is imparted to said clip.

HARRY W. UHLRIG.